US007457467B2

(12) United States Patent
Dance et al.

(10) Patent No.: US 7,457,467 B2
(45) Date of Patent: Nov. 25, 2008

(54) METHOD AND APPARATUS FOR AUTOMATICALLY COMBINING A DIGITAL IMAGE WITH TEXT DATA

(75) Inventors: Christopher R. Dance, La Terrasse (FR); Gabriela Csurka, Meylan (FR)

(73) Assignee: Xerox Corporation, Norwalk, CT (US)

( * ) Notice: Subject to any disclaimer, the term of this patent is extended or adjusted under 35 U.S.C. 154(b) by 754 days.

(21) Appl. No.: 10/767,348

(22) Filed: Jan. 30, 2004

(65) Prior Publication Data

US 2005/0169558 A1 Aug. 4, 2005

(51) Int. Cl.
*G06K 9/62* (2006.01)
(52) U.S. Cl. .................. 382/224; 382/306; 382/305
(58) Field of Classification Search ............... 382/224, 382/306, 305
See application file for complete search history.

(56) References Cited

U.S. PATENT DOCUMENTS

| | | | | |
|---|---|---|---|---|
| 5,459,819 | A * | 10/1995 | Watkins et al. ............. 358/1.18 |
| 5,926,116 | A | 7/1999 | Kitano et al. ................ 340/988 |
| 6,005,972 | A * | 12/1999 | Fredlund et al. ............ 382/176 |
| 6,055,536 | A | 4/2000 | Shimakawa et al. ......... 707/101 |
| 6,177,956 | B1 * | 1/2001 | Anderson et al. ....... 348/207.99 |
| 6,324,545 | B1 | 11/2001 | Morag ......................... 707/202 |
| 6,389,182 | B1 | 5/2002 | Ihara et al. .................. 382/309 |
| 6,810,149 | B1 * | 10/2004 | Squilla et al. ................ 382/224 |
| 6,822,756 | B1 * | 11/2004 | Cok et al. ...................... 358/1.9 |
| 7,020,330 | B2 * | 3/2006 | Schroder et al. ............. 382/167 |
| 7,092,966 | B2 * | 8/2006 | McIntyre .................. 707/104.1 |
| 7,197,158 | B2 * | 3/2007 | Camara et al. ............... 382/100 |
| 7,234,106 | B2 * | 6/2007 | Simske ......................... 715/230 |
| 2002/0030745 | A1 | 3/2002 | Squilla et al. ................ 348/207 |
| 2002/0122067 | A1 | 9/2002 | Geigel et al. ................. 345/788 |
| 2003/0167443 | A1 | 9/2003 | Meunier et al. .............. 715/511 |

OTHER PUBLICATIONS

Yousef Abuzir and Fernand Vandamme, "E-Newspaper Classification and Distribution Based on user profiles and Thesaurus", SSGRR 2002w—International Conference on Advances in Infrastructure for e-Business, e-Education, e-Science, and e-Medicine on the Internet, Jan. 21-27, L'Aquila (Italy), 2002.
Steven V. Brull, "Sony: A Little Sensor With A Big Future", Business Week, Jun. 23, 1997.
CAPNET (Context-aware Pervasive Networking) research program, available on the Internet at http://www.mediateam.oulu.fi/projects/info/capnet, Oct. 2003.
Wesley Chan, "Using CoolBase to Build Ubiquituos Computing Applications", Tech Report, HPL-2001-215, Sep. 2001.

(Continued)

*Primary Examiner*—Samir A Ahmed
*Assistant Examiner*—Eric Rush
(74) *Attorney, Agent, or Firm*—Oliff & Berridge, PLC

(57) ABSTRACT

A digital image is automatically combined with text data by automatically classifying the image according to a predetermined set of categories, and automatically selecting text data from a repository, wherein the selected text data match the category of the image according to a predetermined criterion.

18 Claims, 4 Drawing Sheets

OTHER PUBLICATIONS

Mark Claypool, Anuja Gokhale, Tim Miranda, Pavel Murnikov, Dmitry Netes and Matthew Sartin, "Combining Content-Based and Collaborative Filters in an Online Newspaper", ACM SIGIR Workshop on Recommender Systems Berkeley, CA, 1999.

Computer Vision Meets Digital Libraries, available on the Internet at http://elib.cs.berkeley.edu/vision.html, Oct. 2003.

DyPERS: A Dynamic Personal Enhanced Reality System, available on the Internet at http://www.white.media.mit.edu/vismod/demos/dypers/, Oct. 2003.

R. Fergus et al., "Object Class Recognition by Unsupervised Scale-Invariant Learning", Proc. Of the IEEE Conf. On Computer Vision and Pattern Recognition, 2003.

IST Project Fact Sheet for LAVA (Learning for Adaptable Visual Assistants), 2003 (available on the Internet at http://dbs.cordis.lu/).

Margaret Fleck, Marcos Frid, Tim Kindberg, Rakhi Rajani, Eamonn O'Brien-Strain, Mirjana Spasojevic, "From Informing to Remembering: Deploying a Ubiquitous System in an Interactive Science Museum", Tech. Report HPL-2002-54, 2002.

Margaret Fleck, Marcos Frid, Tim Kindberg, Eamonn O'Brien-Strain, Rakhi Rajani, Mirjana Spasojevic, "Rememberer: A Tool for Capturing Museum Visits", Tech. Report HPL-2002-187, 2002.

Nathalie Glance, Damian Arregui, Manfred Dardenne, "Knowledge Pump: Supporting the Flow and Use of Knowledge", Springer Verlag, Borghoff, U. and Pareschi, R. (Eds), Information Technology for Knowledge Management, 1998.

Markkula, M and Sormunen, E, "Searching for photo—journalists' practices in pictorial IR", presented at The Challenge of Image Retrieval research workshop, Newcastle upon Tyne, Feb. 5, 1998.

L. Mason, J. Baxter, P. Bartlett, M. Frean, "Functional gradient techniques for combining hypotheses", in Advances in Large Margin Classifiers, pp. 221-247, MIT Press, MA, 1999.

K. Mikolajczyk, C. Schmid, "An Affine Invariant Interest Point Detector", European Conference on Computer Vision, pp. 128-142, 2002.

"The Remebrance Agent", available on the Internet at http://www.remem.org/index.html, Oct. 2003.

R. E. Schapire, "A Brief Introduction to Boosting", Proceedings of the Sixteenth International Joint Conference on Artificial Intelligence, pp. 1-6, 1999.

C. Schmidt et al., "Evaluation of Interest Point Detectors", International Journal of Computer Vision, vol. 37, pp. 151-172, 2000.

Smart Modules Program, available on the Internet at http://www.darpa.mil/MTO/SmartMod/index.html, Oct. 2003.

Mirjana Spasojevic and Tim Kindberg, "A Study of an Augmented Museum Experience", Tech. Report, HPL-2001-178, 2001.

Burges, C., "A Tutorial on Support Vector Machines for Pattern Recognition", Data Mining and Knowledge Discovery, pp. 121-167, Feb. 1998.

T. Tuytelaars and L. Van Gool, "Matching Widely Separated Views based on Affinely Invariant Neighbourhoods", submitted to Int. Journal on Computer Vision, Jul. 2001.

Jianhua Xu, Xuegong Zhang & Yanda Li, "Kernal MSE algorithm: a unified framework for KFD", LS-SVM and KRR, Proc. Of IJCNN'01, pp. 1486-1491, Jul. 2001.

\* cited by examiner

METHOD AND APPARATUS FOR AUTOMATICALLY COMBINING A DIGITAL IMAGE WITH TEXT DATA

BACKGROUND OF INVENTION

The present invention relates generally to a method and apparatus for automatically combining a digital image with text data, and more particularly to, a personalized document system that uses the method.

Combining an image with text data is mainly used for two different purposes. On the one hand, the image can serve as an illustration of the content of the text data. On the other hand, an image can be provided with additional information in text form.

It is a common problem in document creation, such as for newspapers or magazines, to retrieve a suitable photo from image collections on the basis of text queries and on the basis of similar-image queries. Typically, the image is retrieved once the subject for the text of an article has already been determined. In current practice, retrieval is based on using text keywords to search manually labeled image data (see, e.g., M. Markkula and E. Sormunen, "Searching for Photos—Journalists' Practices in Pictorial IR", Challenge of Image Retrieval, Newcastle upon Tyne, 1998).

In the above situation, an image is retrieved given some text. The present invention, is concerned with the case of a given image and searching for a suitable text.

A photographic system for enabling interactive communication between a camera and an attraction site is disclosed in U.S. patent application Publication 2002/0030745 A1. In this photographic system, the site stores content data related to the site, and the user communicates with the attraction site through a camera capable of communication with the site. When a photograph is taken at an image spot, the camera communicates personality data to the image spot and the relevant information regarding the spot is communicated by the image spot to the camera. In the case of this photographic system, however, the information sent to the camera is actually independent of the photograph being taken since communicating the information is automatically triggered upon actuation of the camera in the vicinity of an image spot. In other words, a true connection between the image and the text is not established.

In addition, an information retrieval apparatus and method is disclosed in U.S. Pat. No. 5,926,116. According to this method, URLs of WWW servers are stored in a relationship with corresponding position data and image data. A user has a portable terminal to fetch an image and a corresponding position. Then, a host machine receives the image and the positional data, compares them with the stored positional data and the stored image, and displays—upon matching of the position and the image—a corresponding home page.

Further, U.S. Pat. Nos. 6,055,536 and 6,389,182, disclosed systems for linking PC's with small video cameras to supply augmented information about real world situations. The system allows a user to view the real world together with contact sensitive information generated by the computer. The system uses color codes, 2D matrix codes, or infrared beacons to recognize these real world situations. Thus, information is provided upon detection of a code or an infrared beacon related to the information data.

It is a drawback of these existing systems that information is provided only if either the camera is in the neighborhood of a specific attraction site (i.e., at a specific position) or if a specific code or image is detected. Further these existing systems are not flexible because the relation between an image and the information is completely determined in advance. Accordingly, it would be advantageous to provide a method for combining a digital image with text data having proved flexibility, in particular, that allows combining an image with text data even if the location or context of the image is not known in advance.

SUMMARY OF INVENTION

In accordance with the invention, there is provided a method, apparatus and article of manufacture therefor, for automatically combining a digital image with text data. The method includes receiving electronic data comprising a digital image. The digital image is automatically classified according to a predetermined set of categories. Further, text data is automatically selected from a repository that match the category of the digital image according to a predetermined criterion. The text data and the digital image may be combined to form a combined document.

In accordance with one aspect of the invention, the digital image itself is classified according to a predetermined set of categories. Such classification advantageously increases the flexibility of the method since images can be treated that are not known in advance. Another advantage is that there is no requirement to store the image itself in advance for comparison. A further advantage is that identification codes are not required to select and provide text data. Yet another advantage is that there is no fixed and inflexible connection between one predetermined text document and a specific image. Yet an additional advantage is that the selected text data is not strictly linked to an exact location where the original storage location of the digital image.

In accordance with this aspect of the invention, a selection of text data provided in a repository is performed. The electronic data can comprise the digital image (or several digital images) and a corresponding header and possibly further data, for example, regarding a potential recipient. In one embodiment, text data may consist of a single text document. The repository can be a memory of the system in which different text data or text documents are stored.

In accordance with another aspect of the invention, the selected text data can further match a predetermined recipient profile. This allows to select the text data not only depending on the category of the image, but also depending on a potential recipient of the image and the text data. One or different recipient profiles can be stored in a corresponding memory. A recipient profile can particularly comprise parameters such as the age, the language or specific preferences of a potential recipient of the text data and the image. The recipient can be the user (sender of the electronic data) himself or a third party.

Further, this aspect of the invention may involve automatically selecting a recipient profile according to a predetermined criterion, in particular, depending on the sender of the electronic data. This further simplifies and streamlines the processing of the digital image. For example, for each user (i.e., sender) a specific recipient profile of a potential recipient can be stored. Then, a recipient profile is selected if a sender's identifier (e.g., such as the sender name) is recognized and linked to a specific recipient profile. In one embodiment, classifying the image according to a predetermined set of categories may further comprise determining a sender of the electronic data.

The invention can further comprise automatically combining the image and the selected text data to form the combined document. In this way, a combined document is created comprising an image illustrating textural information or an image with additional background information in form of text data, for example. In one embodiment, when in addition to the image category, a recipient profile is taken into account, a combined document that is a personalized document may be formed.

The combined document can consist only of the image and the text or can comprise additional parts such as additional texts or images. In one embodiment, for example, a sender identifier may be added to the combined document. In this way, a potential recipient can identify the sender of the image and, thus, the originator of the combined document.

In accordance with yet another aspect of the invention, the printing of the combined document and/or sending the combined document may be automatically initiated, in particular, in electronic form. Thus, the combined document can be provided in an advantageous way. Printing the combined document is particularly useful if the recipient is either not familiar with electronic media or intends to use the document in an environment in which the electronic form is not suitable.

According to a further embodiment, electronic data may be received over a network, in particular, via electronic mail or via a digital telephone network. The electronic data can be received particularly using multimedia messaging service (MMS). This allows a user to provide the electronic data in an efficient way for further processing in accordance with the invention.

According to a further embodiment, electronic data received by the system may include requesting and/or receiving a recipient identifier and/or a recipient profile. In this way, an intended recipient can be specified, in particular, if either no recipient is known at all or if more than one recipient is possible. In particular, the electronic data received by the system can already include a recipient identifier (e.g., such as a name), which is useful for automatically selecting a recipient profile.

According to another embodiment, electronic data received by the system may be tested, in particular, for authentication, authorization with respect to a potential recipient and/or the image content. This allows the system to check the authorization of the electronic data or its sender to use the method at all or to use the method for a specific recipient. Furthermore, the image content can be tested in order to filter electronic data comprising images with undesired content, for example.

According to a further embodiment, classifying the digital image can be preceded by automatically placing the electronic data on a queue or schedule for classification. Such scheduling can be performed, in particular, if a plurality of incoming electronic data is present or if a combined document is to be provided at a later date. In this way, the flexibility of the method is further enhanced.

In another embodiment of the invention, the text data in the repository can be classified according to the predetermined set of categories to allow text data for an image to be selected that is classified in the same category as the image. Thus, the classification of the image directly corresponds to the classification of the text data; such a criterion for selecting the text data enables a very simple allocation of image and text data.

According to a further alternative, the selection of text data for an image can comprise searching the repository for text data comprising a keyword associated with the category of the image. This provides an alternative criterion for selecting text data matching the category of the image.

Keywords associated with the categories can be obtained in different ways, for example, each category can have a name that is used as keyword. Alternatively, to each category, a list can be provided (e.g., also being stored in the repository of the text data) comprising a plurality of keywords for the corresponding category. If one or more of these keywords is detected in a text document, this text data is selected.

In another embodiment, classifying an image can comprise classifying the image according to a predetermined set of subcategories within a category. In this embodiment, text selection for the image can initiate classification of the image according to a predetermined set of subcategories if more than one text data or text document match the category of the image. This allows for the classification to be refined, which is particularly useful if within one category, more than one text data or text document could be selected and a finer classification of the text data is present.

According to a further embodiment, the electronic data can further comprise image content information data and text classification can include extracting the image content information data. This means that the electronic data contains information (in addition to the image itself) allowing an identification of the image content which simplifies the classification of the image.

According to yet another embodiment, image content information data can comprise positional and/or temporal information regarding the image, wherein image classification can comprise comparing the position and/or temporal information with a lookup table. For example, a lookup table can be present comprising a list of events together with their date and location. Thus, if the image content information data comprises positional information (for example, as obtained via a GPS being part of the camera for taking the picture) and temporal information (for example, as obtained via a clock being part of the camera) and if a corresponding event is contained in a lookup table, the image content can be identified.

According to a further embodiment, image classification can comprise extracting content information from the image. In such a case, a user can send an image without any additional information, and the method determines the content of the image from the image itself and automatically classifies the image based on its content. This highly increases the user friendliness of the method. Possible methods for extracting the content can be based on known computer vision approaches, for example, performing feature extraction using texture segmentation, interest point detectors and color-texture histograms, combined with machine learning methods such as support vector machines, boosting or Gaussian models. These are methods known from image processing yielding a sufficiently reliable classification. Alternatively, extracting content information from the image can comprise applying a kernel image categorization method or a multi-classifier method. With these methods, a optimized classification of an image along different classifiers can be obtained.

BRIEF DESCRIPTION OF DRAWINGS

These and other aspects of the invention will become apparent from the following description read in conjunction with the accompanying drawings wherein the same reference numerals have been applied to like parts, and in which.

DETAILED DESCRIPTION

Figure 1:
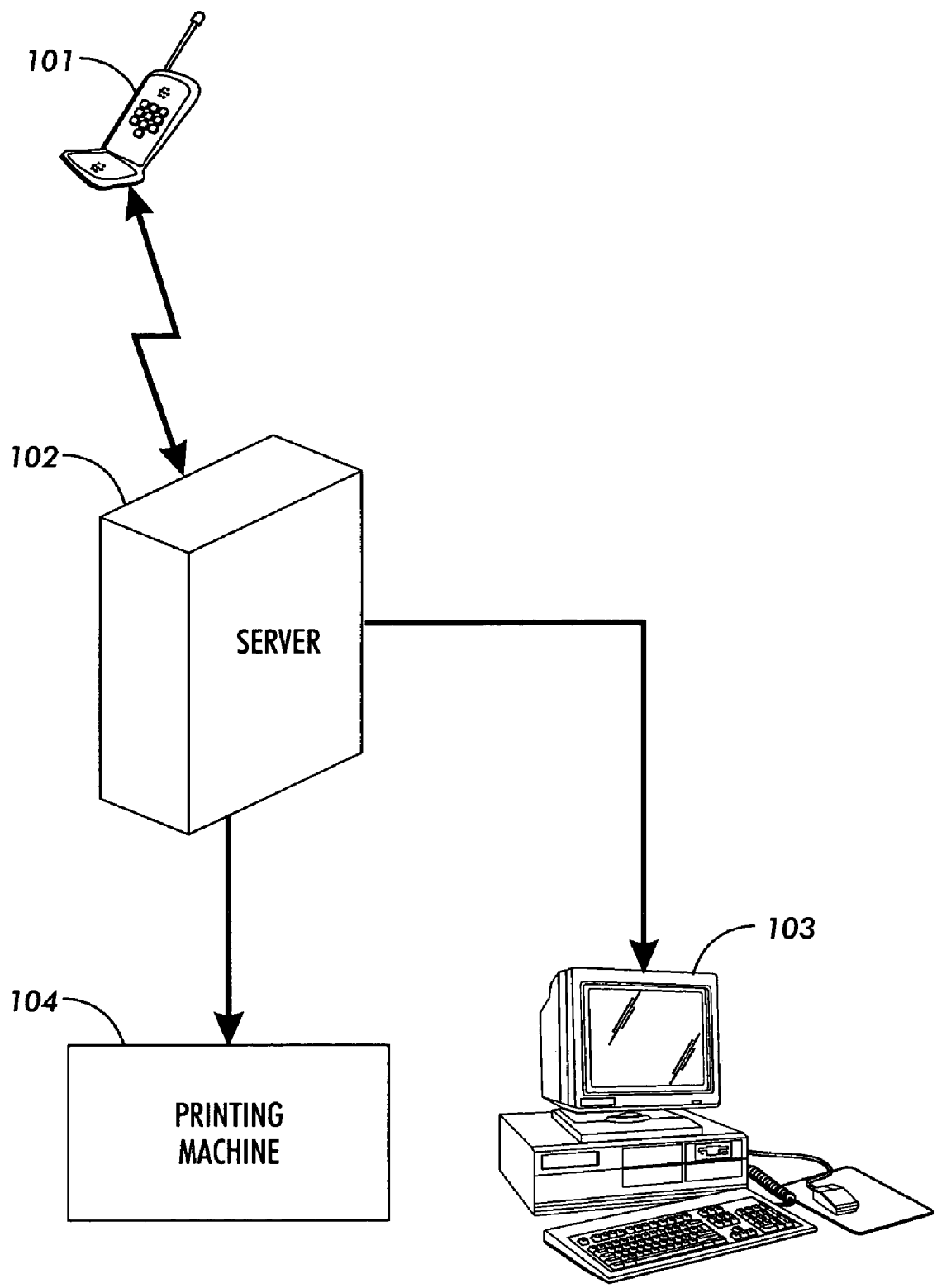
FIG. 1 illustrates the interplay between different components for performing an example of the method according to the invention.

FIG. 1 illustrates an example of different components in the context of which the present invention can be performed. For the method according to the invention, a digital image has to be provided in some way. According to the example shown in FIG. 1, this is achieved by sending a digital image from a mobile phone 101 to a server 102.

According to this example, the mobile phone 101 comprises a camera for taking pictures. One of these images is then sent to a server via a corresponding digital telephone network, for example, by using multimedia messaging service (MMS). Transmitting the image from a mobile phone via a telephone network has the advantage that a user can provide the image from almost any location.

There are other possibilities to provide a digital image to a server as well. For example, a picture can be taken by a standard digital camera from which the image is uploaded to a computer. Then, the digital image can be sent to the server 102 via electronic mail. This is advantageous if a corresponding network has a higher bandwidth than, for example, a telephone network being available for the user.

The server 102—which, for example, can serve as personalized document generation system depending on the circumstances under which the method is performed—is responsible for combining the image with text data. Examples illustrating this combining of a digital image and text data are described below.

The server 102 can be used to provide a combined document (e.g., a digital image and text data) to a recipient. For example, a combined document can be sent directly to the computer 103 of a recipient via electronic mail. According to an alternative embodiment, a combined document can be transmitted to a personal digital assistant (PDA) via a telephone network, for example.

Alternatively or additionally, the server 102 can initiate printing the combined document at a printing machine 104. For example, if the combined document will be part of a personalized newspaper, the server can send the combined document to a server of newspaper printing machine where it is integrated into the newspaper before printing.

In FIG. 1, the combining of a digital image with text data is performed by a single server 102. It is to be understood that the different functions of the method can also be performed on different devices. Furthermore, not all the data required for performing the method need be present on a single server; some data, for example, such as recipient profiles, can be received from an external source.

Figure 2:
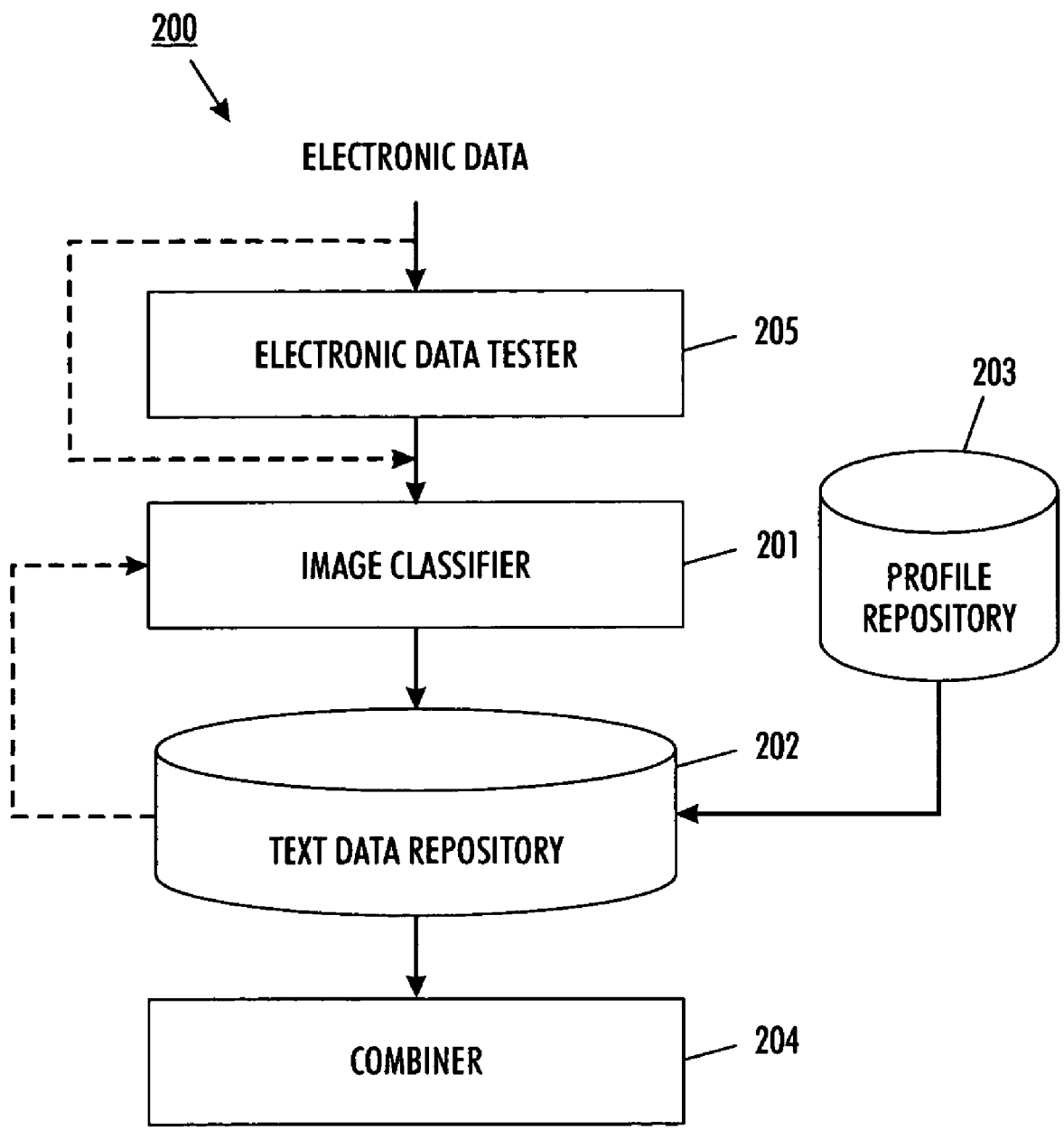
FIG. 2 illustrates the structure of an example of a system for performing the method according to the invention.

The structure of an example of a system 200 for performing a method for combining a digital image with text data is illustrated in the FIG. 2.

In one embodiment, electronic data comprising a digital image is initially received by an image classifier 201. The image classifier 201 is responsible for classifying the digital image according to a predetermined set of categories. The set of categories may depend on the field of application of the method. For example, if the method is used to generate a personalized newspaper, possible categories could be: travel, family, home, garden, local events, fun, and stories. In the case of producing a personalized guidebook, the categories can correspond to different countries, subcategories within each category can correspond to specific cities; as an alternative, the categories or subcategories can comprise different types of sightseeing or parts of a city or region.

After the image has been classified by image classifier 201, text data to be combined with the image are fetched from a text data repository 202. This text data repository 202 comprises a memory in which the text data is stored. The text data can be single text documents dealing with different topics such as newspaper articles or several documents such as chapters of a guidebook.

Depending on how the text data from the repository 202 is selected, the text data in the repository 202 can also be classified according to a set of categories. This set of categories of the text data can but need not be identical to the set of classification categories for the images used by the image classifier 201.

For example, if the text data in the repository 202 is classified in the same categories as the images are classified in image classifier 201, it is possible that within a category, the text data is further classified according to a predetermined set of subcategories (e.g., garden articles could be associated with one of the categories flowers, food, lawn, patio, trees, bushes, water features). In such a case, image classifier 201 could be used again to perform a classification according to these finer grained categories. Then, the text data in repository 202 is selected depending on whether the image agrees with these finer grained categorizer tests.

In addition to such a matching of categories, the automatic selection of text data can further be based on a personal profile of an intended recipient. In order to obtain this additional criterion, a corresponding personal profile is taken from a profile repository 203. In this repository, different profiles can be stored. For example, for each user of the system which sends an image to the system, the profile of exactly one recipient can be stored; this recipient might be a third party or the user itself.

However, it is also possible to store personal profiles of different recipients for each user. In such a case, the user has to specify for which user a combined document is intended. This can be achieved, for example, by transmitting a recipient's identifier such as a name for identifying a corresponding profile together with the digital image to the system. In such a case, the electronic data comprises not only a digital image but also a recipient's identifier. Alternatively, if the system detects that more than one recipient is associated with a specific user, it might prompt the user to specify the recipient in each case.

After the text data is selected, the image and the text data are combined in combiner 204 to form a combined document. This combination can be done in different ways. In the simplest case, the text data and the image can simply be stored as a single document in a single file. However, it is also possible to determine a specific layout or arrangement of the text and the image. In this case, an automated document layout procedure can be used. Furthermore, in addition to the image and the text data, also the sender of the image can be identified, for example, by a corresponding author indication.

In the embodiment shown in FIG. 2, the image classifier 201 is optionally preceded by an electronic data tester 205. In this tester, the incoming electronic data comprising the digital image is tested. For example, it can be tested whether the electronic data comprises a target recipient specification and/or message authentication data. Furthermore, the image content can be tested as well in order to ensure that no images are processed, the content of which is not desired according to specific criteria. Electronic data tester 205 can also test whether the sender of the electronic data is authorized to provide a combined document for a target recipient being specified. If one of these tests fails, for example, the method would not be performed; furthermore, the sender could be informed accordingly.

As already stated above, these different parts or elements of the system 200 need not be incorporated in a single device. For example, the processing of the image and the combining with the text data could be performed on a first server whereas a second server could comprise the repositories with the text data and the recipient profiles.

In the following, some possible applications for which the method according to the invention could be used will be described. However, these examples are not intended as limitations; further fields of application are possible as well.

According to a first class of examples, a personalized newspaper can be created. For example, a grandmother's personalized newspaper might contain pictures their grandchild took in a distant town, associated with an article about foreigners in that town. Photos taken while skiing can get printed with an article advertising ski shops. On the birthday of a person, a newspaper could be created with a friend's picture in the "Birthday's column" on the front page and a birthday rhyme might be automatically retrieved and printed with the photo. The pictures of the place a person visited last year could be included, comparing them with images of that place today. According to a further example, a user's own pictures of a football match that they attended are categorized as "About Sports" and placed on the sports page of the personalized newspaper.

In the context of magazines or storybooks, a child could take a picture of a toy, then receives the story about the toy printed with its picture in his weekly comic. Pictures from a person's sister's trip to Hawaii are included with articles on Honolulu in the person's copy of Amateur Geographic. A mother's column about childcare might contain pictures of her own daughter.

According to a further example, a holiday brochure can include photos as a memory of the holiday a person took with a given travel company. Pictures a user takes of the statue in the town centre and in the local art gallery can be included in the user's evening guide pamphlet along with more detailed information about the artifacts. A user can submit pictures he took on a trip to Moscow to his sister's personalized document service to produce her personalized guidebook to Moscow for when she visits there in the future.

In the context of advertisements, a photo a person took which is categorized as hot and sweaty gets included as part of a soft drink advertisement. A photo a person took by a specific car or by his local fast food restaurant gets included in a corresponding car or restaurant advertisement.

As a further example, animal photos taken by a child on his visit to the zoo can be included with education text about the food chain in his personalized animal biology book at the end of the visit.

Figure 3:
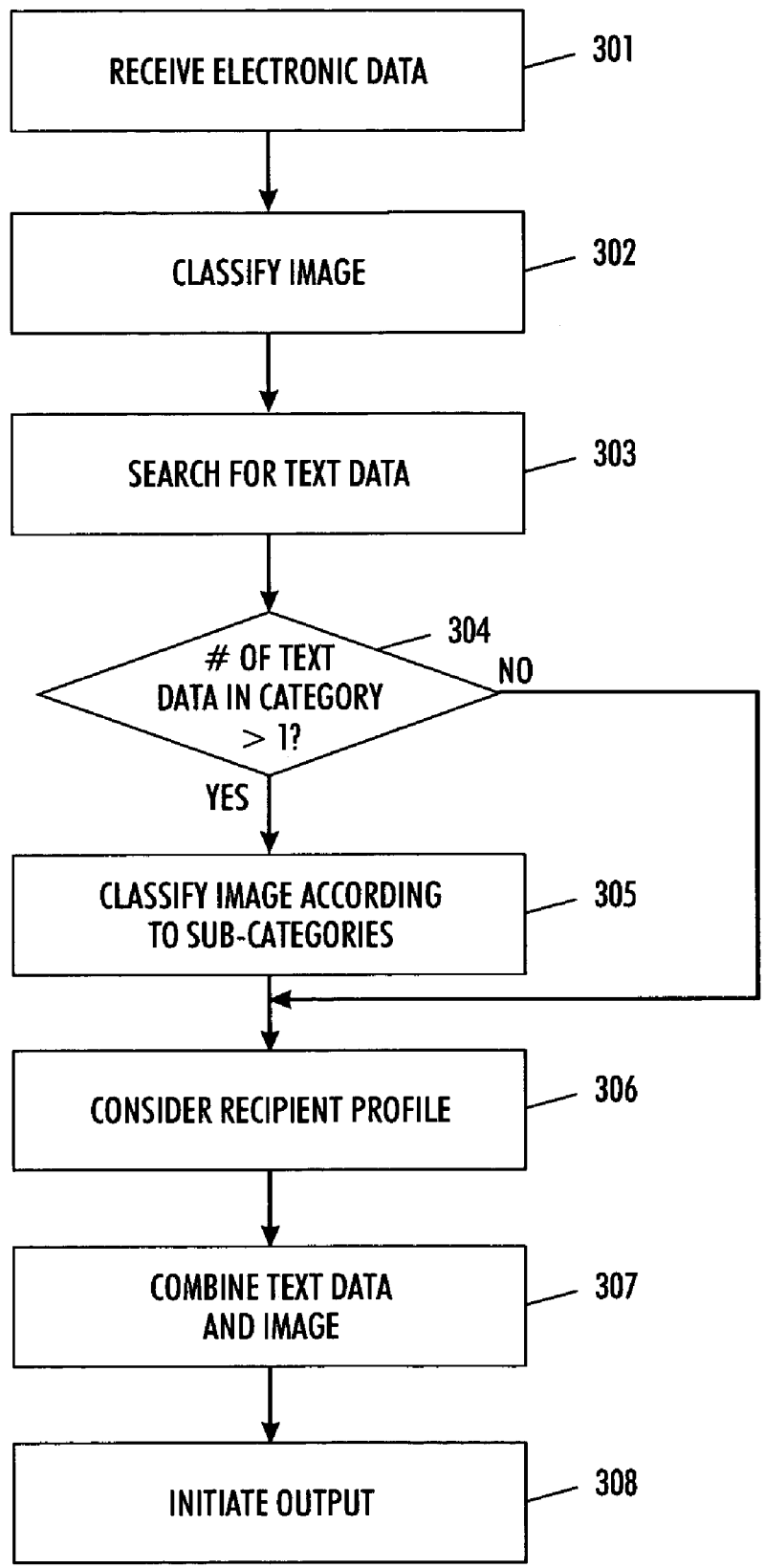
FIG. 3 is a flow diagram of an example of a method for automatically combining a digital image with text data according to the invention.

In the following, different functions of an example of a method for combining text data and an image are explained with reference to the flow diagram of FIG. 3.

Initially at 301, electronic data comprising a digital image is received. Optionally, this electronic data may be tested upon receipt as was described above with reference to the electronic data test 205 (shown in FIG. 2).

At 302, the image is classified according to a predetermined set of categories, which will be explained in more detail with reference to FIG. 4 below.

After having classified the image at 302, the text data repository is searched at 303 for text data matching the category of the image according to a specific criterion. In the simplest case, the text data stored in the repository can also be classified according to the same categories as the image classification is performed. In this case, all text data falling under the same category as the image match the image's category.

According to an alternative, for each category, a list of keywords can be provided. In this case, for example, all text data are searched for one of these keywords. It could also be possible that each text document (being stored as single text file) is associated with at least one keyword. This keyword can be, for example, a document's title; alternatively, a list can be provided associating one or several keywords to each text file. Then, a text matches the category of the image if the text's keyword corresponds to a keyword of the image's category.

Subsequently at 304, it is tested whether more than one text document is present that matches the image category. If yes, according to this example, a further classification of the image into subcategories can be performed at 305. In such a case, the text documents should also be classified according to subcategories within a given category. Then, classification at 305 represents a form of feedback.

If more than one text document matches the image's category, but if these texts belong to different subcategories, the repeated classification at 305 is performed on the image in order to obtain a similar sub-classification as the text documents. For example, if an image has been classified according to category "Garden" at 302, and in the corresponding text category, there are three texts belonging to the sub categories "Flowers", "Trees" or "Lawn", a new classification of the image is performed at 305 in order to determine to which of these three subcategories the image belongs.

The recipient's profile is considered at 306. In considering a recipient's profile, the profile data of a target recipient that has been specified by the sender are taken into account, for example, by requesting the corresponding data from a profile repository. These profile data could comprise information regarding the recipient's age, preferences or hobbies, language or an indication of articles the recipient has already read. Depending on these parameters, a further selection among different text data can be made. It is to be understood that considering the recipient profile at 306 can also be performed at an earlier stage, for example, before the additional classification into subcategories is made at 305.

After having selected one or more text documents based on the previously tested criteria, the text data and the image are combined in some way at 307. For example, if a personalized newspaper is created, the corresponding layout has to be determined, which in one embodiment is performed by an automated document layout procedure.

Finally at 308, the output is initiated. In the previously mentioned example of the personalized newspaper, the printing of the newspaper can be initiated, for example, by sending the necessary information to a newspaper printing machine.

Figure 4:
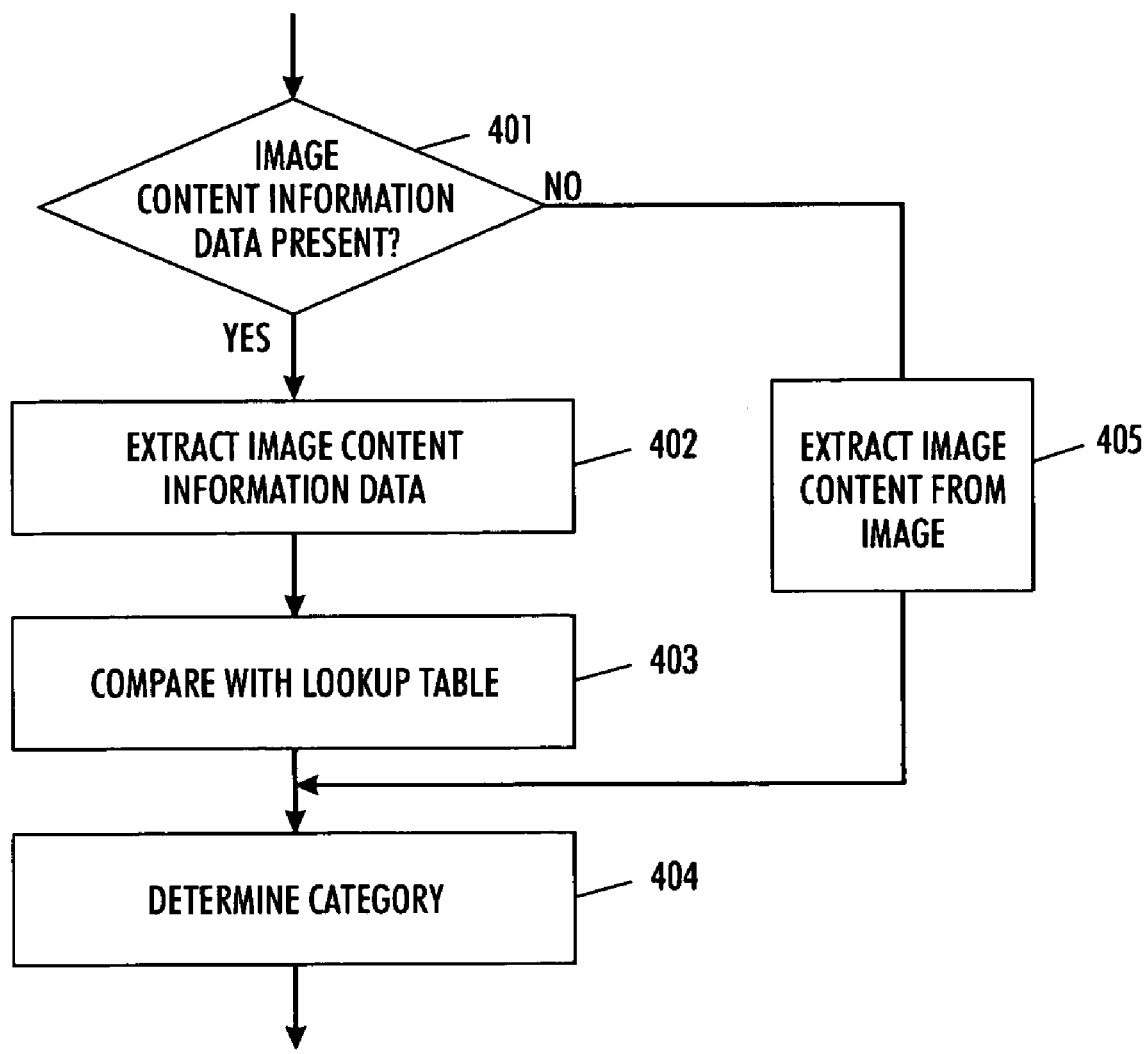
FIG. 4 is a flow diagram of an example of a method for automatically classifying a digital image according to the invention.

FIG. 4 is a flow diagram of an example of a method for automatically classifying a digital image according to the invention. Such image classification may, for example, be performed at 302 and 305 in FIG. 3.

Initially at 401, it is determined whether any image content information data is present in the electronic data received from the sender. Corresponding image information content data could be temporal or positional information about the image. For example, the image could have been taken using a camera comprising a GPS (global positioning system) module and/or a clock. In such a case, a picture taken by the camera can be sent to the system together with the positional information from the GPS module and the time.

Then, at 402, this image content information data is extracted from the electronic data. Subsequently at 403, the extracted data is compared with a lookup table. For example, an image location can be identified using the positional information and searching for sightseeing points in a corresponding lookup table. An event can be identified by a lookup in an event table combining location with time information as indexing key.

Based on the information obtained via these lookup tables, the category of the image is determined at 404. For example, each lookup table could correspond to a specific category. Lookup tables could be present, for example, for events and/or landmarks for concerts, sightseeing, sports events, etc.

However, if no image content information data is present in the electronic data received from the sender, the system can extract image content information from the image itself at 405. Of course, it is also possible to perform category determination at 404 in addition to data extraction at 402 and lookup table comparison 403, in particular, if there is no unique result.

Extracting image content for image, categorization at 402 can be performed in different ways. In particular, machine-learning techniques can be used in this context. In order to apply such techniques, the image has to be represented in a way a learning technique can use. An example for this is an image representation method based on texture segmentation. Methods such as the region clustering approach can be used to train a system using a training set.

A suitable method for image categorization performed at 404 is described in R. Fergus et al., "Object Class Recognition by Unsupervised Scale-Invariant Learning", Proc. of the IEEE Conf. on Computer Vision and Pattern Recognition 2003, which is incorporated herein by reference. According to the method, image categorization is performed using an entropy-based feature detector to select regions and their scale within the image. An expectation-maximization in a maximum-likelihood setting is used for learning the parameters of the object model, whereas in recognition this model is used in a Bayesian manner to classify images.

Another family of techniques for performing image categorization at 404 is given by the support vector machine (SVM). Interest point detectors (described, for example, in "Evaluation of Interest Point Detectors", C. Schmidt at el., International Journal of Computer Vision, volume 37, page 151-172, 2000, which is incorporated herein by reference) can be used for performing image categorization at 404 as well.

Alternatively, an image is classified at 404 using one of these methods but with different parameters or using different methods. When classifying an image with one or several methods, it is useful to determine a "best result" along different classifiers. Many different state-of-the-art classifiers can satisfactorily be employed, for instance: one might exploit kernel categorization methods through the use of Support Vector Machines (as described in V. N. Vapnik, "Statistical Learning Theory", John Wiley & Sons, New York, 1998, which is incorporated herein by reference), or other kernel methods (as described in J. Xu, "Kernel MSE Algorithm: A Unified Framework for KFD, LS-SVM and KRR", Proc. Of IGCNN01, pages 1486-1491, 2001, which is incorporated herein by reference); or a multi-classifier systems based on boosting (as described in R. E. Schapire, "A Brief Introduction to Boosting", Proceedings of the Sixteenth International Joint Conference on Artificial Intelligence. pages 1-6, 1999), or on approximations of functional gradient descent (as described in L. Mason et al., "Final Gradient Techniques for Combining Hypothesis", Advances in Large Margin Classifiers, pages 221-247, MIT Press, Mass., 1999, which is incorporated herein by reference).

Using the foregoing specification, the invention may be implemented as a machine (or system), process (or method), or article of manufacture by using standard programming and/or engineering techniques to produce programming software, firmware, hardware, or any combination thereof. It will be appreciated by those skilled in the art that the flow diagrams described in the specification are meant to provide an understanding of different possible embodiments of the invention. As such, alternative ordering of the steps or functions, performing one or more steps or functions in parallel, and/or performing additional or fewer steps or functions may be done in alternative embodiments of the invention.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method for automatically combining a digital image with text data, comprising:
   (a) receiving electronic data comprising a digital image;
   (b) automatically classifying the image according to a predetermined set of categories;
   (c) searching a repository of categorized text data for text data having a parent category corresponding to the category of the image, according to a predetermined criterion,
   (d) iteratively searching a plurality of sub-categories of categorized text data, of the parent category, for text data corresponding to the category of the image according to the predetermined criterion, wherein each corresponding sub-category becomes the parent category for the next iteration of the search; and (e) automatically selecting text data from the repository that belongs to the sub-category of text data corresponding to the category of the image according to the predetermined criterion in the final iteration of the search;

wherein (a), (b), (c), (d) and (e) are executed on one or more servers;

the text data is not metadata;

the text data is at least one of a newspaper, book, magazine, brochure, pamphlet or advertisement; and each of the newspaper, book, magazine, brochure, pamphlet or advertisement are stored as a text file.

2. The method according to claim 1, wherein the selected text data corresponds to a predetermined recipient profile.

3. The method according to claim 2, wherein said selecting at (e) further comprises automatically selecting a recipient profile according to a predetermined criterion.

4. The method according to claim 3, wherein the predetermined criterion is the sender of the electronic data.

5. The method according to claim 1, further comprising automatically combining the image and the selected text data to form a combined document.

6. The method according to claim 1, further comprising at least one of automatically initiating printing of the combined document and sending the combined document.

7. The method according to claim 1, wherein said receiving at (a) comprises receiving the electronic data over a network via at least one of electronic mail and a digital telephone network.

8. The method according to claim 1, wherein said receiving at (a) further comprises requesting and receiving at least one of a recipient name and a recipient profile.

9. The method according to claim 1, wherein said receiving at (a) further comprises testing the electronic data regarding at least one of authentication, authorization with respect to a potential recipient, and content of the image.

10. The method according to claim 1, wherein said classifying at (b) is preceded by automatically placing the electronic data on a queue or schedule for classification.

11. The method according to claim 1, wherein said selecting at (e) further comprises searching the repository for the sub-categorized text data comprising a keyword associated with the category of the image.

12. The method according to claim 1, wherein the electronic data further comprises image content information data and wherein said classifying at (b) further comprises extracting the image content information data.

13. The method according to claim 12, wherein the image content information data comprises one or more of positional and temporal information regarding the image, and wherein said classifying at (b) further comprises comparing at least one of the position and temporal information with a lookup table.

14. The method according to claim 1, wherein said classifying at (b) further comprises extracting content information from the image.

15. The method according to claim 14, wherein extracting content information from the image comprises applying at least one of a kernel image categorization method and a multi-classifier method.

16. A method for automatically combining a digital image with text data, comprising:

(a) receiving electronic data comprising a digital image;

(b) automatically classifying the image according to a predetermined set of categories; and (c) searching a repository of categorized text data for text data having a parent category corresponding to the category of the image, according to a predetermined criterion, (d) iteratively searching a plurality of sub-categories of categorized text data, of the parent category, of the text data corresponding to the category of the image according to the predetermined criterion, wherein each corresponding sub-category becomes the parent category for the next iteration of the search; and (e) automatically selecting text data from a repository that belongs to the category for text data corresponding to the category of the image according to the predetermined criterion in the final iteration of the search;

wherein (a), (b), (c), (d) and (e) are executed on one or more servers;

the text data is at least one of a newspaper, book, magazine, brochure, pamphlet or advertisement; and each of the newspaper, book, magazine, brochure, pamphlet or advertisement is stored as a text file.

17. An apparatus including one or more servers for automatically combining a digital image with text data, comprising:

a receiving means on at least one of the one or more servers configured to receive electronic data comprising a digital image;

a classification means on at least one of the one or more servers configured to automatically classify the image according to a predetermined set of categories;

a searching means on at least one of the one or more servers configured to search a repository of categorized text data for text data having a parent category corresponding to the category of the image, according to a predetermined criterion, an iterative search means configured to search a plurality of sub-categories of categorized text data, of the parent category, for text data corresponding to the category of the image according to the predetermined criterion, wherein each corresponding sub-category becomes the parent category next iteration of the search; and a selection means on at least one of the one or more servers configured to automatically select text data from a repository that belongs to the sub-category for text data corresponding to the category of the image according to a predetermined criterion in the final iteration of the search, wherein the text data is not metadata;

wherein the text data is at least one of a newspaper, book, magazine, brochure, pamphlet or advertisement; and wherein each of the newspaper, book, magazine, brochure, pamphlet or advertisement is stored as a text file.

18. The apparatus according to claim 17, further comprising a combining means configured to automatically combine the image and the selected text data to form a combined document.

* * * * *